(12) United States Patent
Soriano

(10) Patent No.: US 6,537,356 B1
(45) Date of Patent: Mar. 25, 2003

(54) GAS AND SOLID TRAP FOR AN INTRAVENOUS LINE

(76) Inventor: Nathaniel M. Soriano, 16640 Orangewind La., Riverside, CA (US) 92503

(*) Notice: Subject to any disclaimer, the term of this patent is extended or adjusted under 35 U.S.C. 154(b) by 0 days.

(21) Appl. No.: 09/369,555

(22) Filed: Aug. 6, 1999

(51) Int. Cl.⁷ ............................................. B01D 19/00
(52) U.S. Cl. .................... 96/155; 96/219; 210/188; 604/4.01
(58) Field of Search .............. 95/241; 96/155, 96/219; 210/188; 604/4.01, 5.01, 5.04, 6.09, 406

(56) References Cited

U.S. PATENT DOCUMENTS

| | | | | |
|---|---|---|---|---|
| 2,597,699 A | * | 5/1952 | Bauer | 96/155 |
| 3,295,297 A | * | 1/1967 | Collins | 96/155 |
| 3,778,973 A | * | 12/1973 | Martinez | 96/155 |
| 3,803,810 A | * | 4/1974 | Rosenberg | 604/4.01 |
| 3,834,124 A | * | 9/1974 | Ichikawa | 96/219 |
| 4,085,047 A | * | 4/1978 | Thompson | 210/188 |
| 4,102,655 A | * | 7/1978 | Jeffery et al. | 210/188 |
| 4,341,538 A | * | 7/1982 | Vadnay et al. | 96/219 |
| 4,568,330 A | * | 2/1986 | Kujawski et al. | 604/4.01 |
| 4,643,713 A | * | 2/1987 | Vitala | 96/155 |
| 4,828,587 A | * | 5/1989 | Baurmesiter et al. | 96/219 |
| 5,674,199 A | * | 10/1997 | Brugger | 604/4.01 |
| 5,824,212 A | * | 10/1998 | Brockhoff | 96/155 |

* cited by examiner

Primary Examiner—Duane S. Smith
(74) Attorney, Agent, or Firm—Donn K. Harms

(57) ABSTRACT

A device for trapping of gas and solids in a fluid stream flowing in an intravenous injection mechanism. The trapping device features a longitudinal peanut shaped revolved housing configuration having an outlet nozzle projecting axially inside an internal chamber at approximately the midpoint of a passageway. This allows the outlet nozzle to remain submerged in the fluid under an infinite number of tilt positions and angles. The trap outlet has proximal end with cooperative attachment with conventional intravenous fluid systems and distal end of which may attached to conventional intravenous fluid conduits and devices such as angiocath or plastic needle. Using one or a plurality of chambers having a diameter at bulged cavities that are substantially larger than the diameter of the internal nozzle, gas bubbles and sediment are trapped in the bulging cavity spaces away from centrally located inlet nozzle thus protecting the patient.

16 Claims, 3 Drawing Sheets

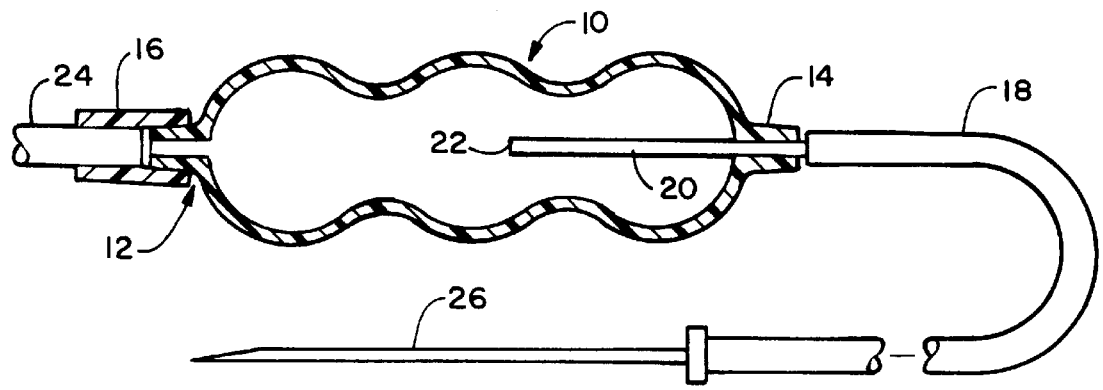
FIG. 3
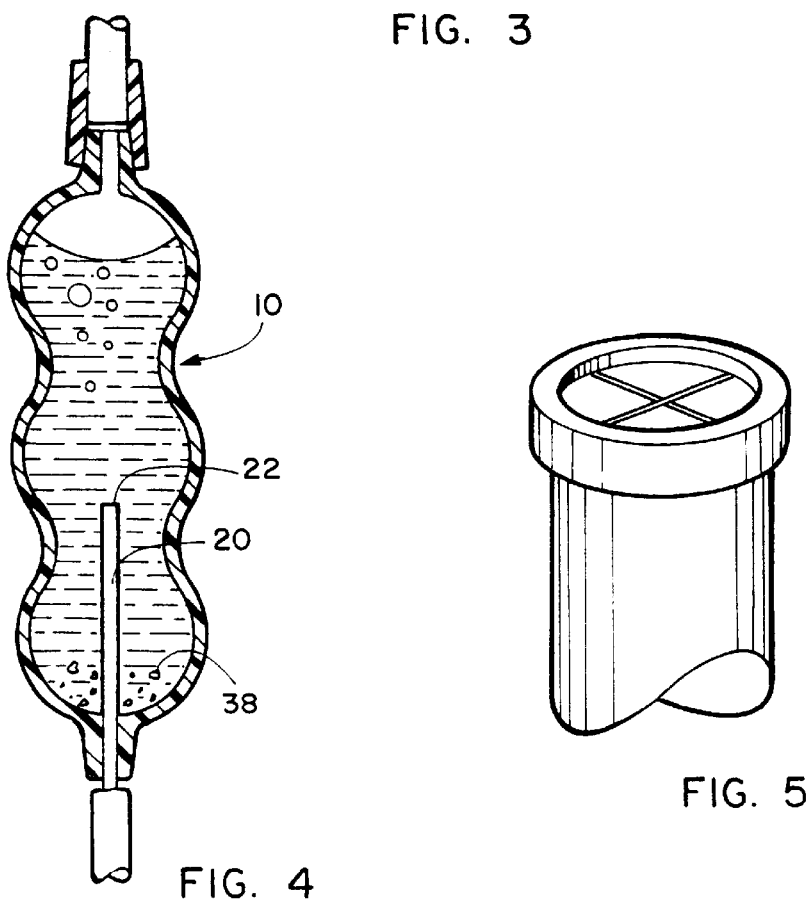
FIG. 4
FIG. 5
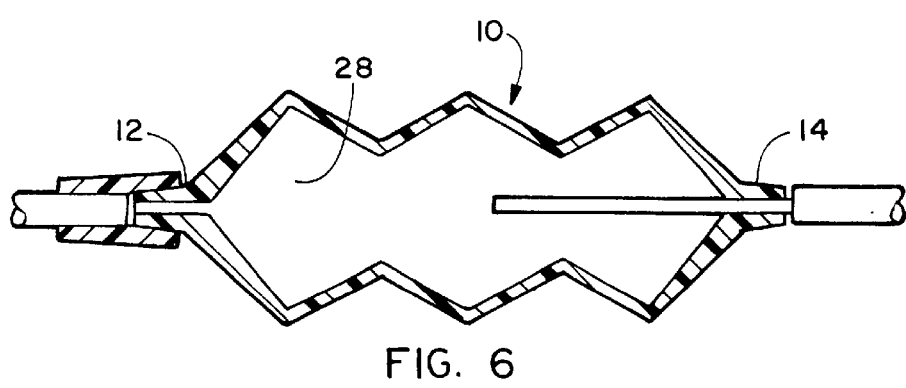
FIG. 6

GAS AND SOLID TRAP FOR AN INTRAVENOUS LINE

BACKGROUND OF THE INVENTION

1. Field of the Invention

The present invention relates to the intravenous injection of liquids into the body. More particularly, the invention relates to an improved apparatus for trapping sediment and gaseous bubbles for preventing undesirable materials from entering the body with the injected liquid.

2. Prior Art

Gas and solid gas traps are commonly used in the United States and throughout the world for trapping gas bubbles and sediment to prevent them to enter intravenous injection fluid lines. Most such apparatus and systems are either bulky in size, complex to manufacture and some allow the reentry of gas bubbles or sediment into the intravenous (IV) line under a sudden move of patient's limb. Such current devices also falter when employed in the field under rough handling and transport conditions such as during a disaster, a battlefield or when administering transfusion in a helicopter.

It is also known that there exist a common hazard associated with the injection of fluid into the veins of a human or animal when gas bubbles and sediment enter the body. Commonly, when air bubbles are observed in an intravenous transparent tubing line, the injection needle must be withdrawn immediately from the vein, the supply line purged of the air bubbles, and the needle reinserted into the vein to continue the injection. This operation is time-consuming and often painful and dangerous to the patient. If air bubbles enter the vein with the injection liquid, an air embolus is produced, usually resulting in severe pain to the patient, and if allowed to continue even for several seconds, the patient may receive a dangerous or fatal amount of air. Even though a constant watch is maintained, it is not infrequent for a severe or fatal air embolus to develop within a matter of several seconds. The repeated purging of air from the tubing which connects the injection needle to the liquid supply results in a loss of valuable medicinal material, and as usually performed, the medicinal liquid is sprayed over the floor and on equipment in the room where the patient is being treated.

In the prior art, gas and solid trap devices for use in blood transfusion or for other intravenous injection are provided at the wall portion in the neighborhood of a projection or needle sometimes using filters or other manner of entrapment.

Although various devices have long been known for intravenous injecting medicinal liquids into the body, the most widely practiced process is known as the gravity-flow method. In that method a hypodermic needle is connected by rubber tubing to a vessel containing the fluid to be injected. The vessel, which is usually provided with a flow-regulating cock, is suspended above the patient, and after the regulating cock, tubing and needle are completely purged of air, the needle is properly inserted into the patient's vein and the solution is allowed to flow by gravity into the vein.

There are a number of approaches advanced in prior art, however such prior art still leave problems regarding the size of apparatus, the ease of manufacture of devices which ultimately affects the cost of the apparatus and most importantly the heath risk involved with the reentry of bubbles and sediment into the intravenous injection fluid. However, prior art addresses only partially these issues leaving a constant hazard to users of such devices.

U.S. Pat. No. 2,597,699, Bauer, teaches an air and sediment trap comprised of a cylindrical tube with a bulging space that must be kept continuously in a vertical position. Bauer's device is cumbersome in size and causes a major health risk factor if the bulging space is turned upside-down or otherwise displaced in the wrong direction.

U.S. Pat. No. 3,834,124, Ichikawa, teaches a gas trap device with longitudinal extending U-shaped passageway for intravenous use. In this degassing device the rising of bubble or gas is prevented by the axial flow of a transfusion liquid. However, the removal of gas or bubbles from a transfusion liquid is not necessarily complete in such devices. In addition, The device is difficult to manufacture and has the same disadvantage than Bauer, it fails to prevent sediment and air bubbles to reenter the intravenous line if positioned anywhere but upright.

U.S. Pat. Nos. 5,312,352 and 5,439,448, Leschinsky et al., teach a system and method for connecting two fluid carrying tubes, one having a bubble elimination port. The bubble elimination port closes to the fluid circuit after tube connections are done and thus does not provide a trap for trapping incoming gas bubbles or solids on an ongoing basis.

In most above mentioned devices, drawbacks are encountered that sudden changes in position of the patient's limb cause air bubbles and sediment to be entrained back into the line and ultimately to the patient. As such, there exists a need for an easily and inexpensively manufactured apparatus, which can be safely used to trap sediment and gas bubbles in fluids flowing in intravenous injection lines. Furthermore such an apparatus should operate in an infinite number of apparatus tilt angles and use conventionally used intravenous tubing apparatus. Such a device should also be easily used by employees without the need for extensive training.

SUMMARY OF THE INVENTION

In summary, the applicant's device overcomes drawbacks of the prior art by providing a novel apparatus for the trapping of gaseous bubbles and solid particles entrained in the fluids circulating in fluid-tight conduits of generally all sizes used in intravenous supply to humans and animals. The device when inserted into the conduit between the fluid source and patient, traps gas bubbles and solid particles entrained in fluids flowing in intravenous tubes in particular.

In one aspect, the present invention relates to an apparatus for trapping gas bubbles and foreign solid particles in a continuous, fluid-tight circuit. The preferred embodiment of the device generally includes a longitudinal revolved chamber having one or preferably a plurality of bulging walls, a first inlet end having inlet orifice means communicating at one end with internal bulging chamber walls. A second exit at the opposite end having second outlet orifice provides a means for communication with the interior of a cavity having internal opposing bulging chamber walls using a rigid tube or nozzle axially disposed relative said chamber having inlet aperture projecting into second outlet orifice at a midpoint into said bulging chamber.

Incoming low density bubbles entrained in IV fluid once entering the chamber from any angle, surge instantly toward fluid surface pushed by buoyancy forces generated by the density differential between the denser IV fluid and the low density bubbles, while heavier solid particles sediment at bottom. Such natural forces push continuously on the bubbles and solids in a direction away from the center of liquid flowing through said longitudinal chamber. The bubbles forcing their way toward the outer wall of the chamber creates favorable conditions for a bubble-free, solid-free IV liquid to exit through the aperture located at the end of the centrally located outlet nozzle inside the chamber in order to enter a patient's body.

According to a further important feature of the present invention, the aperture inside diameter of a central outlet nozzle is kept small in the range of 0.5–2.5 mm, preferable 2 mm to prevent entrainment of bubbles of generally bigger diameter to squeeze themselves out of this novel trap. Depending on the density and viscosity of each intravenous fluid, the aperture diameter of outlet tube may also be provided with a cross-hair partition ring reducing further the size of said diameter aperture, thus impeding further any possibility for bubbles to exit the trap.

The cooperative attachment to the trap may be frictionally engaged, threadably engaged or engaged by male-female coupling adapter or otherwise cooperatively engaged or use a combination thereof.

It is an object of this invention to provide an easily used, sterile and disposable free-bubble apparatus to trap gas bubbles and solid particles entrained in fluids flowing in intravenous injection lines no matter what angle the device is placed.

Another object of this invention is to provide an easily manufactured and operated apparatus for the trapping of solid particles and gaseous bubbles entrained in intravenous injection lines.

A further object of this invention is to provide a very cost-effective and efficient method of trapping gas bubbles and solid foreign particles from circulating fluids in general and from flowing liquids in intravenous injection lines in particular.

An additional object of this invention is to provide a gas bubble and solid particle trap that is easily operable requiring no adjustment, little skill, no training or dexterity.

Further objects of the invention will be brought out in the following part of the specification, wherein detailed description is for the purpose of fully disclosing the invention without placing limitations thereon.

BRIEF DESCRIPTION OF DRAWING FIGURES

FIG. 3 shows an extension tube with a rigid central plastic nozzle at the proximal end, the distal end of which is attached to angiocath needle.

FIG. 4 is a side view of the invention moving from horizontal to the vertical position with gas bubbles trapped at the top end and solid particles sedimenting at bottom at the fluid inlet.

FIG. 5 shows a cross hair filter in one of the inlet or outlet apertures of the device.

FIG. 6 is a cross-sectional view of a 3 conical bellows configuration of a bubble and sediment trapper with the rigid central nozzle in its midpoint position in the passageway.

DETAILED DESCRIPTION OF THE PREFERRED EMBODIMENTS OF THE INVENTION

Figure 1:
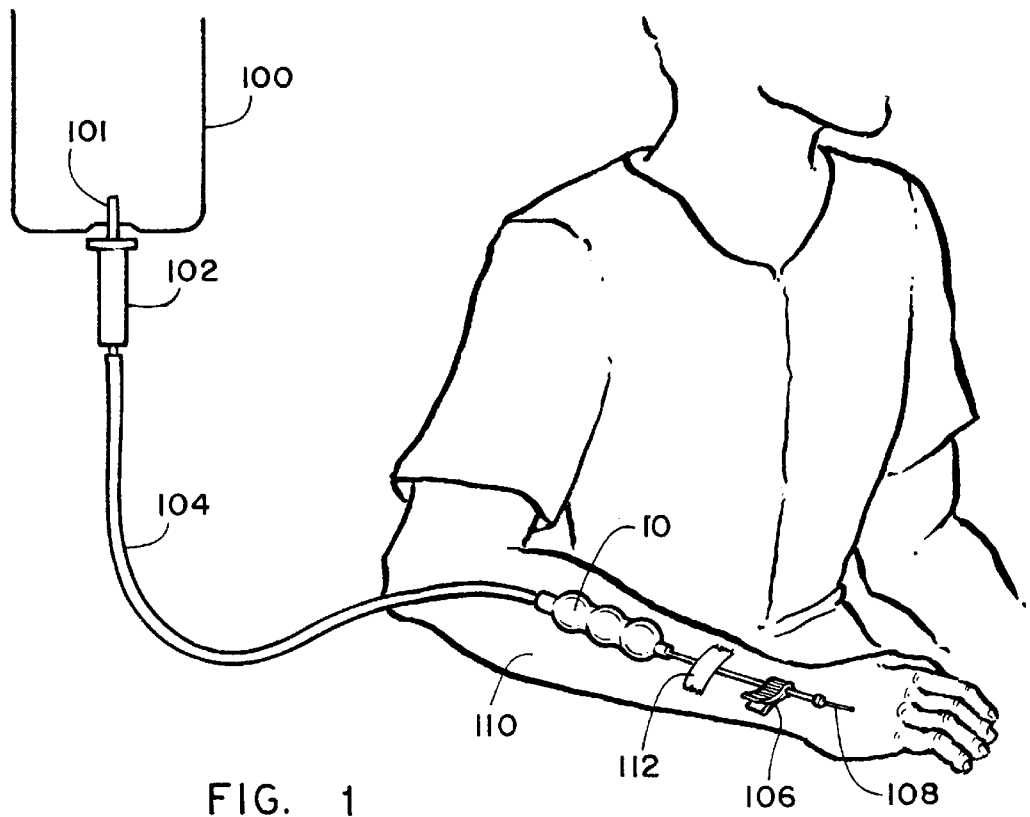
FIG. 1 shows an intravenous fluid injection set in which a gas and solid trap device according to the present invention.

Referring now to the drawing FIGS. 1 through 8 depict current preferred embodiments of the gas and solid trapping apparatus according to the present invention by reference to the drawings. FIG. 1 shows a diagrammatic view of an intravenous fluid transfusion set with the device 10 herein disclosed inserted into an intravenous line. Reference numeral 100 shows a main vessel arranged at a higher place than the patient to provide a gravity feed. The main vessel may be a transfusion bottle or bag. The main vessel 100 is connected through a penetrating needle 101 to the fluid transfusion set which is connected through a dip chamber 102 and gas trap 10 to an injection needle 108. As generally provided with a gas trap device 10 there is provided a clamp 106. The opening and closing of the clamp 106 controls the flow of the desired amount of liquid to be injected through the injection needle 108 into a human or animal body limb such as, but not restricted to, the hand 110. The device 10 may be adhesively attached to a human limb by a tape 112.

The device 10 would be configured at its exterior for conventional connection to existing conventional IV injection lines. The method of connecting the present invention to existing conventional IV injection lines such as indicated in FIG. 1 generally includes the steps of attaching first the primary supply line 104, to the device 10 at an inlet orifice 12, at a proximal location to the injection needle 26, by means of a cooperative attachment 16 followed by the second step of attaching trap outlet 14 to a conventional tube extension set 18 having a sealed communication to a veniculture needle 26.

In step three the trap is filled with primary fluid and primed, then follows a purge of bubbles 36 out of said trap by spraying out of said needle 26 a controlled amount of said fluid at a low gravity point. A clamp 106 closes the flow and said trap is adhesively taped 112 to the patient limb 110. As the IV needle is introduced into the body, the clamp 106 is opened and said fluid let to flow. Thus the device 10 may be used with all the conventional tubes and hookups of current IV systems with little or no modifications to those devices and is easily installed by people with little or no additional training.

Figure 2:
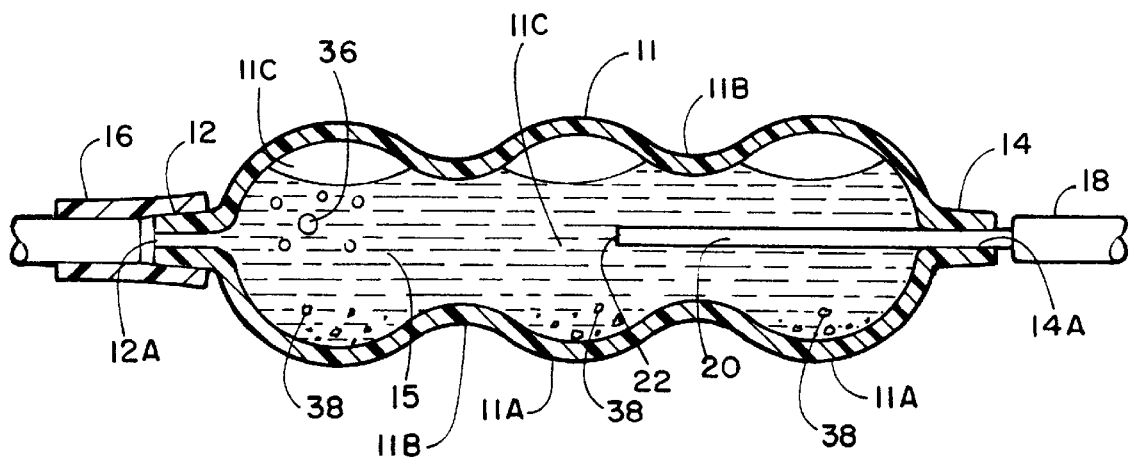
FIG. 2 is a side view of the device in horizontal position showing a flexible primary tube attached to the gas and sediment trapper.

To explain the gas and solid trap apparatus in more detail the device 10 is shown in FIG. 2. The device generally includes an elongated housing made best of transparent rubber, glass, or synthetic resin, generally designated 11, defining an internal chamber or passageway, generally designated 15. Elongated housing 11 includes a longitudinal revolved body having bulging walls 11a and depressed walls 11b formed by one or plurality of cavities and in the current best mode three such cavities 11c. The housing 11 has two orifices 12 and 14 located at opposite housing ends, opening into internal chamber 15. The first orifice 12 is at inlet end having inlet orifice 12a communicating with internal bulging chamber walls and second opposite orifice at outlet end 14 having outlet orifice means 14a communicating with opposite said internal chamber walls. An elongated rigid tube or nozzle 20 is axially disposed in the interior chamber 15 with a nozzle aperture 22 projecting internally inside said elongated chamber 15 at substantially a midpoint distance between the inlet and outlet orifices 12 and 14 at a location preferably having maximum diameter of bulging walls at internal chamber 15 center. To cooperate with conventional standards the device could be manufactured to have a volume in the internal chamber 15 of either 5–50 cc. or 50 to 500 cc. however other volumes might also be used for different standards or for industrial filtering of a fluid stream need cleansing of bubbles.

Another embodiment of the present invention may also be provided with an insertable rigid outlet nozzle 20 that projects axially into of trap chamber 15 at midpoint and cooperatively attaches itself via a flexible extension tube 18 to an IV needle 26. The inner diameter at the nozzle aperture 22 of this outlet nozzle 20 in the current best mode should be 0.5–3 mm, preferably 2 mm however that may change depending on the application.

Such a gas and bubble device 10 may be primed in the conventional manner, by opening the device outlet extension tube 18 to the atmosphere, and then filling the chamber trap 10 with the transfusion liquid until the transfusion liquid starts to exit at the outlet nozzle 20, by attaching and purging the needle 26, thereby assuring that all air within the IV system has been removed. During transfusion operation, because incoming bubbles 36 entrained in IV fluid have lower density, those bubbles find themselves pushed upward by buoyancy forces created in the IV fluid having higher density, thereby said bubbles surge instantly in the gas and solid trap toward upper level of fluid surface, lodging themselves in the traps 11c formed in the cavities while heavier solid particles 38 sediment at chamber bottom cavities 11a attracted by gravity forces. Such opposing buoyancy upward forces and gravity downward forces keep liquid in chamber central area clear from both bubbles and solids, while only bubble-free, solid-free IV liquid is sucked through the nozzle 20, said suction being induced by the differential atmospheric pressure generated by the flow of the IV fluid from a higher position of the main liquid vessel 100 to the lower position of the fluid outlet at the injection needle level 108.

According to a further important feature of the present invention, the aperture inside diameter 22 of central outlet nozzle 20 is kept small in the range of 0.5–2.5 mm, preferably 2 mm to prevent entrainment of generally bigger diameter bubbles to squeeze themselves and escape out from this novel trap. Depending on the density and viscosity of various intravenous fluids, the aperture diameter 22 of outlet nozzle 20 may also be provided with a geometry, such as but not restricted to, a cross-hair partition ring 40 reducing further the size of said diameter aperture, thus impeding further any possibility for bubbles 36 to enter nozzle aperture 22 and escape out of the trap 10.

Another important feature of the present invention is the infinite number of tilt angle positions that the trap may assume and still provide a complete trap for all air bubbles 36 from exiting the device 10. This feature is made possible by providing protection against the escape of air bubbles into the infusion liquid whenever the liquid filling up more than half the chamber volume causes the bubbles to rise, thus producing a seal effect with respect to the aperture 22 of the outlet nozzle 20, as shown in FIG. 4.

Cooperative attachment 16 for both housing inlet section 12 and housing outlet section 14 with peripheral tubings 18 and 24 may be either frictionally engaged as in 16b, threadably engaged as in 16a, engaged by male-female coupling adapter or by snapping means 50, or a combination thereof.

Figure 7:
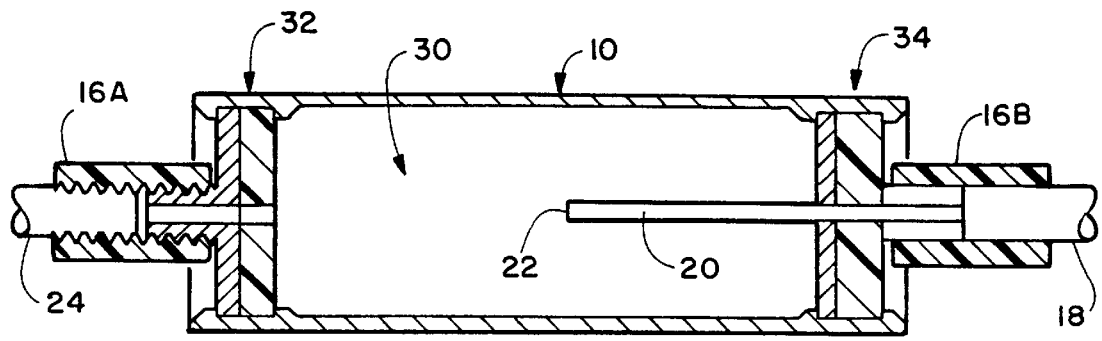
FIG. 7 is a cross-sectional view of a cylindrical configuration of a bubble and sediment trapper with the rigid central nozzle in its midpoint position in the passageway and filters in position at each end.
Figure 8:
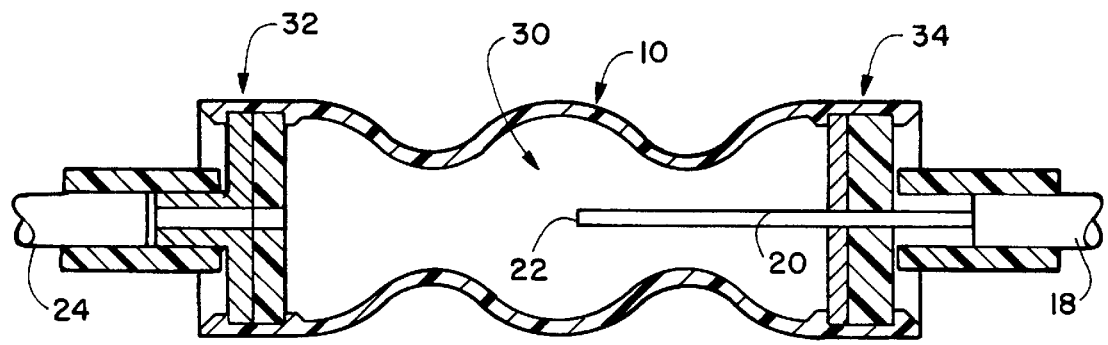
FIG. 8 is a cross-sectional view of a 3-peanut-seed configuration of a bubble and sediment trapper with the rigid central nozzle in its midpoint position in the passageway and filters in position at each end.

In another embodiment of the invention at FIGS. 5, 7, and 8, various types of filters 32 and 34 such as plastic mesh or other porus filter material are placed at trap chamber inlet orifice 12 or at chamber outlet exit 14 or a combination thereof. The device would function the same as noted above as to trapping of air bubbles.

It will be appreciated that this device is an easily manufactured and operated apparatus. It concurrently provides generally, a means for trapping gas bubbles and foreign materials in circulating liquids in fluid-tight conduits and more particularly, in medicinal fluids flowing in intravenous tubing.

The device is normally adhesively taped 112 to a patient's limb 110 closest to the patients vein where it will stop every bubble and particle that might enter the line. It thus provides safety of operation closest to the patent where it will do the most good and can provide this protection because of the ability to stop bubbles under infinite number of tilt angles because no matter what the angle the patent's hand reaches the device 10 will not allow gas bubbles that might enter the device exit to the patient.

Furthermore the device 10 provides a gas and solid trap which is light, esthetically pleasant, and easy to adhesively tape against a human body due to the exterior shape helping it hold thereto. This allows for use in a method which avoids the practice of withdrawing bubbles by means of a needle, syringe or of disconnecting the intravenous line all together to purge the bubbles, thereby preserving the integrity of the sterility of the system.

The present invention also annuls the health risks associated with the accidental injection of unwanted air bubbles and foreign material into a human body, thus reducing substantially health liability associated with intravenous injection therapy. Furthermore, it reduces and cancels the need for reinserting the same IV needle in the vein of a patient because of air embolus, which action usually results in severe pain to the patient, and if allowed to continue even for several seconds, causes the patient to receive a dangerous or fatal amount of air.

Even though a constant watch may be maintained, it is not infrequent for a severe or fatal air embolus to develop within a matter of several seconds. In addition, the repeated purging of air from the tubing which connects the injection needle to the liquid supply by spraying which results in a loss of valuable medicinal material.

Such lost quantity of medicinal liquid finds itself, as usually performed, sprayed over the floor and equipment in the room where the patient is being treated, thus littering the room and causing additional health risk to the patient. It is also known that the monitoring of patients receiving IV fluids with intention to protect them against entrained gas bubbles in an IV supply line is both stressful and time-consuming.

The preferred embodiment of the invention features a longitudinal "3-peanut-seed" shaped chamber configuration as show is best made of transparent rubber, glass, or plastic, and as noted above an extension tube with the proximal end screwed in place at the outlet of the trap, the distal end of which is attached to the angiocath or plastic needle.

Another preferred embodiment of the invention feature a longitudinal "plural-peanut-seed" shaped chamber configuration as shown is for a 3 seed configuration, having plural odd numbers of bulges best made of transparent rubber or plastic, an extension tube with the proximal end screwed in place at the outlet of the trap, the distal end of which is attached to the angiocath or plastic needle.

Another preferred embodiment of the invention features a longitudinal cylindrical shaped configuration as shown in FIG. 7 best made of transparent rubber or plastic passageway chamber, an extension tube with the proximal end screwed in place at the outlet of the trap, the distal end of which is attached to an angiocath or plastic needle. This embodiment, while not working as well as the peanut shaped device will function to remove bubbles which rise on entering to hug the interior wall.

Yet, another preferred embodiment of the invention features a longitudinal conical bellows shaped configuration as shown in FIG. 8 best made of transparent rubber or plastic for the passageway chamber, an extension tube with the proximal end screwed in place at the outlet of the trap, the distal end of which is attached to an angiocath or plastic needle.

While all of the fundamental characteristics and features of the gas and solid trap for an intraveneous line device have been shown and described, it should be understood that various substitutions, modifications, and variations may be made by those skilled in the art without departing from the spirit or scope of the invention. Consequently, all such modifications and variations are included within the scope of the invention as defined by the following claims.

What is claimed is:

1. An apparatus for trapping bubbles in a fluid flowing through an intravenous fluid apparatus comprising:
    an elongated housing having two ends and an internal chamber;
    said housing having bulging symmetrical walls forming a plurality of cavities in said internal chamber;
    an inlet orifice communicating with said internal chamber at a first end of said elongated housing;
    an outlet orifice communicating with said internal chamber at a second end of said elongated housing;
    an elongated tube having an inlet end communicating through an axial passage to an outlet end, said elongated tube axially disposed in said chamber, with said outlet end in communication with said outlet orifice;
    said inlet end of said elongated tube centrally disposed in one of said plurality of cavities; and
    whereby any bubbles in said fluid which circulate through said chamber are prevented from exiting said chamber in said housing.

2. The apparatus as claimed in claim 1 additionally comprising means of attachment of said housing to a mount wherein said apparatus will function at any of an infinite number of angles of disposition of said housing.

3. The apparatus as claimed in claim 1 wherein said bulging symmetrical walls of said housing form a peanut shaped housing defining a peanut shaped chamber.

4. The apparatus as claimed of claim 1, wherein said symmetrical walls of said housing form plurality of bellow shaped cavities.

5. The apparatus as claimed in claim 1, wherein said symmetrical walls of said housing are parallel and form a cylindrical shaped cavity.

6. The apparatus as claimed in claim 1, wherein said walls of said housing are comprised of flexible material thereby allowing for compression of said walls, said compression of said walls yielding a means for pumping fluid therethrough.

7. The apparatus as claim 1, additionally comprising a filtering means, said filtering means disposed at one or both of said inlet orifice or said outlet orifice.

8. The apparatus of claim 7, in which said filtering means is a plastic mesh.

9. The apparatus of claim 7 in which the said filtering means is a disc of porous material.

10. The apparatus as claimed in claim 7, wherein said filtering means is thermally fused to the end wall portion of said apparatus.

11. The apparatus as claimed in claim 1, wherein said internal chamber has a volume of 5–50 cc.

12. The apparatus as claimed in claim 1, wherein said internal chamber has a volume of 50–500 cc.

13. The apparatus as claimed in claim 1, wherein said chamber has a volume in a range of about 10 to 20 cc.

14. The apparatus as claimed in claim 1, having a means for cooperative attachment with peripheral tubing attached thereto.

15. The apparatus as claimed in claim 1, additionally comprising means of attachment of said inlet orifice with a reservoir of blood.

16. The apparatus as claimed in claim 1, additionally comprising means of adhesive attachment to a human body.

* * * * *